July 27, 1943.  F. L. HAUSHALTER ET AL  2,325,132
PROTECTOR FOR DRILL STEMS
Filed Oct. 28, 1941
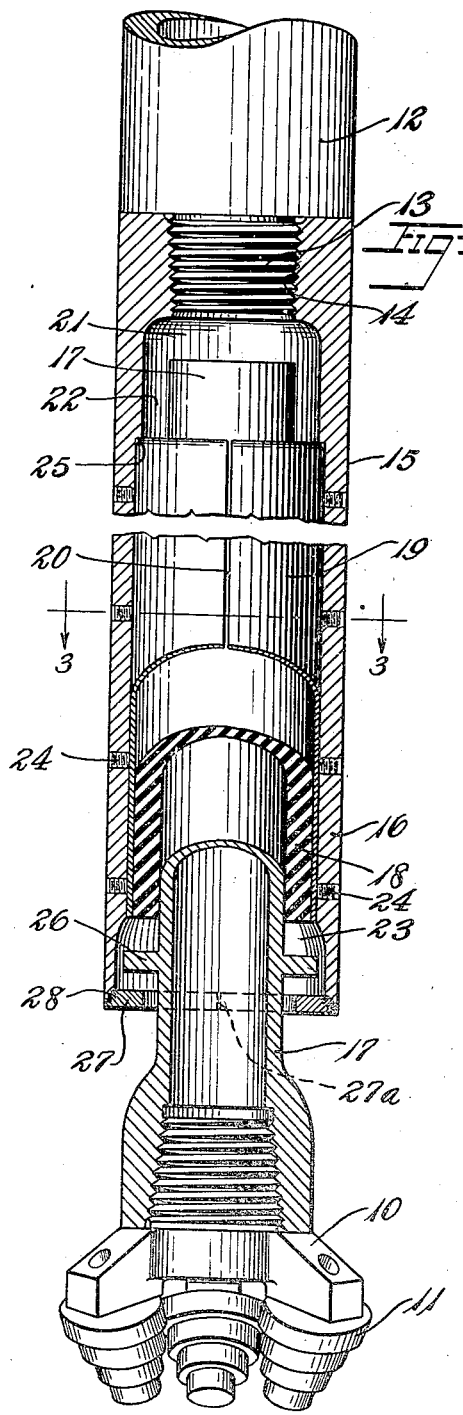
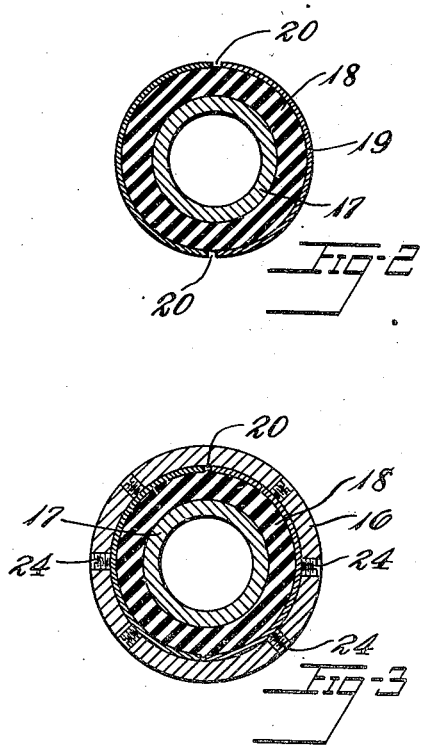
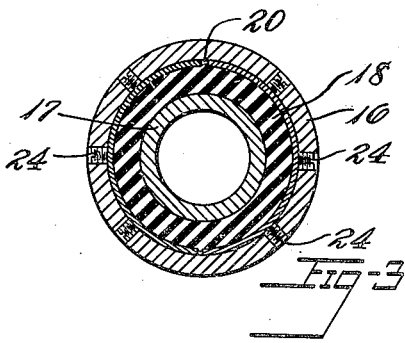
Inventors
Leon I. Horchitz
Fred L. Haushalter
By Willis F. Avery
Atty.

Patented July 27, 1943

2,325,132

UNITED STATES PATENT OFFICE 2,325,132

PROTECTOR FOR DRILL STEMS

Fred L. Haushalter, Akron, Ohio, and Leon L. Horchitz, Los Angeles, Calif., assignors to The B. F. Goodrich Company, New York, N. Y., a corporation of New York Application October 28, 1941, Serial No. 416,818

4 Claims. (Cl. 255—28)

This invention relates to the protection from the effects of vibration and shock of drill stems and associated structure employed in drilling wells.

In the drilling of oil, gas, water, and other wells by the rotary drilling process, a rotary bit operating far below the surface of the ground at the bottom of the well has been rotated from a rotatable platform located above the ground through a hollow drill stem made of threaded sections of steel pipe. The bit often operates thousands of feet below the surface of the ground, the weight of the drill stem acting to apply feeding pressure to the bit. Due to the great length of the stem, the weight applied to the bit, the construction of the bit, and the nature of the rock against which the bit is rotated, the drill stem is subjected to longitudinal and torsional shocks and vibrations having a deleterious effect upon the drill stem, the hose and its swivel, and the chains or cables which support them from the derrick, setting up dangerous fatigue stresses in the drill stem and unfavorable vibrations in the hose swivel and its supporting cables, and in the hose which supplies mud laden water to the bit. Such vibrations may be induced by irregular cutting due to difference in hardness of the rock causing the bit to chatter and set up vibrations in the drill stem.

The present invention aims to overcome the foregoing and other difficulties and to provide an improved shock insulator or cushioner for protecting the drill stem from the effects of vibration and shock.

The principal objects of the invention are to provide effectively for the absorption of axial and torsional vibrations of the drill bit, to provide a flexible driving connection between the drill and its stem, to reduce noise and vibration, and to provide against loss of the bit in case of rupture of the cushioning unit.

These and other objects will appear from the following description and the accompanying drawing.

Of the drawing:

Fig. 1 is a side elevation, partly in section, of the lower end of the drill stem, the bit, and apparatus for protecting the stem from vibration illustrating and embodying the invention, other parts being broken away.

Fig. 2 is a cross-sectional view of the vibration dampening unit.

Fig. 3 is a cross-sectional view taken on line 3—3 of Fig. 1.

In accordance with the invention a section of the drill stem adjacent the bit is provided with telescoped tubular metallic members between which a bushing comprising rubber or other rubber-like resilient material is secured to cushion vibration. The rubber bushing is preferably normally under radial compression and is bonded by vulcanization to at least one of, but preferably both, the inner and outer metallic members. Preferably the outer member is secured to the rubber by a metal sleeve in the form of a discontinuous or longitudinally split shell of metal adapted to be radially reduced in circumference when the bushing is in place. The rubber spring is preferably of such dimensions and compound as to have a natural frequency of vibration materially less than that of the imposed vibration, preferably as low as one third or lower of the period of vibration imposed upon the spring by the bit, the latter in the case of a three-cone bit being three times the rotational speed of the drill stem. By this construction, very low transmissibility of the impressed vibration is made possible. The rubber bushing is so enclosed by overlapping spaced apart flanges on the telescoped metallic members as to prevent loss of the bit upon failure of the rubber bushing.

Referring to the drawing, the numeral 10 designates a drill bit which may be of any desired form but which is shown as of the roller bit type having three conical stepped cutting rollers 11. The drill stem 12 is of hollow tubing to permit the passage of fluid for cooling the drill and for washing cuttings from the well, and each section has the tapered male 13 and female 14 coupling threads for connecting the sections to each other or to well tools.

To provide for absorbing vibration and cushioning the drill stem from the bit in accordance with the invention, a section 15 adjacent the bit is formed of an outer tube 16 of metal having an internal coupling thread 14 at its upper end, and an inner tube 17 of metal of smaller diameter, having a coupling thread at its lower end, with a shock absorbing bushing or spring 18 of resilient rubber or other rubber-like material, telescoped therebetween under radial compression. The rubber bushing 18 is preferably of elongated cylindrical form and is vulcanized to the inner tubular member 17 and to a split sleeve 19 of sheet metal extending thereabout. The sheet metal sleeve may be of one or more pieces providing one or more longitudinal spaces 20 therebetween to permit circumferential reduction in size of the bushing. When assembled, the rubber bushing 18 and its attaching sleeve 19 are radially compressed and inserted within the tube 16 under radial compression. A clearance space 21 is provided between the upper end of the tube 17 and the upper end of the cavity of the tube 16 in which it is located to permit axial deflection of the bushing 18 under shear loading, and the tube 17 is also spaced radially from the tube 16 at its upper end, as at 22 and at its lower end, as at 23 to prevent contact of the tubes 16 and 17.

To prevent slipping of the sleeve 19 after assembly, a multiplicity of set screws 24 may be inserted in radial threaded openings in the sides of the tube 16 so as to bear against the sleeve and lock it in place and an annular shoulder 25 may be formed on the interior of the tube 16 to transfer the load from the sleeve 19 to the tube 16 when the drill stem is loaded for drilling purposes to put pressure on the bit.

The rubber bushing is so proportioned as to dimensions and density of the rubber composition as to have a natural period of vibration of materially less than the period of the impressed vibration, preferably as low as one-third or one-fourth or even a smaller fraction of the period of impressed vibration period of the drill bit assembly, which arrangement provides very low transmissibility of the impressed vibration. Since the natural frequency of vibration of a spring is a function of the deflection of the spring, the design of the rubber spring to give the characteristics desired for the purpose herein described can be readily arrived at.

The rubber spring is also useful in absorbing tortional vibration produced by fluctuating torque loads. As the present practice is to maintain a load of 14,000 pounds on the drill, this simplifies the design of the rubber sleeve since it can be designed to sustain such a constant load, and the deflection for any desired load may be ascertained and the clearance spaces proportioned accordingly.

To provide against loss of the bit in case of failure of the rubber bushing, an outwardly directed radial flange 26 may be provided at the lower end of the tube 17 and spaced from the lower end of the rubber bushing, and an inwardly directed flange 27, extending therebelow may be provided on the lower end of the tube 16 in spaced apart relation thereto. The flange may be secured in place after assembly of the tubes and the rubber bushing by welding as at 28, and the flange may be split as at 27a to permit mounting of it over the shank of the bit. Should the rubber bushing fail, the flange 26, being larger than the opening in the flange 27, will limit falling of the tube 17 which carries the bit.

While the invention has been described as employed directly at the bit where it has the advantage of cushioning the entire stem thereabove, other locations are not precluded, and while the invention has been described as used with a drilling bit, it is to be understood that it may be used advantageously with reamers and other tools.

The invention effectively absorbs axial and torsional vibrations and reduces fatigue stresses of the drill stem and its supporting cables and of its hose connections and other associated structure.

Variations may be made without departing from the scope of the invention as it is defined by the following claims.

We claim:

1. A protector for a rotary drill stem comprising a pair of hollow structures arranged one within the other and spaced-apart from each other, one of said structures being adapted and arranged for mounting on the drill stem, and the other being adapted and arranged for driving a drill tool, a circumferentially discontinuous sleeve secured within the outer structure, and a body of resilient rubber-like material mounted between said sleeve and the inner structure and secured to both and comprising the sole connecting means therebetween, said body having a natural frequency of vibration less than the impressed frequency of vibration of the drill tool.

2. A protector for a rotary drill stem comprising a pair of tubular structures arranged one within the other and spaced-apart from each other, one of said structures being adapted and arranged for mounting on the drill stem, and the other being adapted and arranged for driving a drill bit, a circumferentially discontinuous sleeve secured within the outer structure, and a bushing comprising resilient rubber-like material mounted under radial compression between said sleeve and the inner structure and secured to both and comprising the sole connecting means therebetween, said bushing having a natural frequency of vibration of less than about one-third of the impressed frequency of vibration period of the drill bit.

3. A protector for a rotary drill stem comprising a pair of tubular metal members arranged one within the other and spaced-apart from each other, one of said members being adapted and arranged for mounting on the drill stem, and the other being adapted and arranged for driving a drill bit, and a bushing comprising a tubular body of resilient rubber-like material mounted under radial compression between said members and having a circumferentially discontinuous sleeve between it and the outer member, said body being bonded to the inner member and said sleeve and having a natural frequency of vibration of less than about one-third of the impressed frequency of vibration period of the drill bit.

4. A protector for a rotary drill stem, said protector comprising a pair of drill stem members, one having a tubular portion and the other having a shank portion extending loosely into said tubular portion, said members having means for connecting them to other members of a drill stem, a discontinuous metal sleeve, means for detachably engaging said sleeve with one of said portions, and a tubular body of resilient rubber-like material between said sleeve and the other said portion and bonded by vulcanization to said sleeve and to the other said portion, said body being mounted under radial compression between said sleeve and the other said portion and comprising the sole power transmitting means therebetween.

FRED L. HAUSHALTER.
LEON L. HORCHITZ.